June 18, 1940.  G. TIPTER  2,205,022
BORE HOLE DIRECTION TESTER
Original Filed Dec. 27, 1937   3 Sheets-Sheet 1
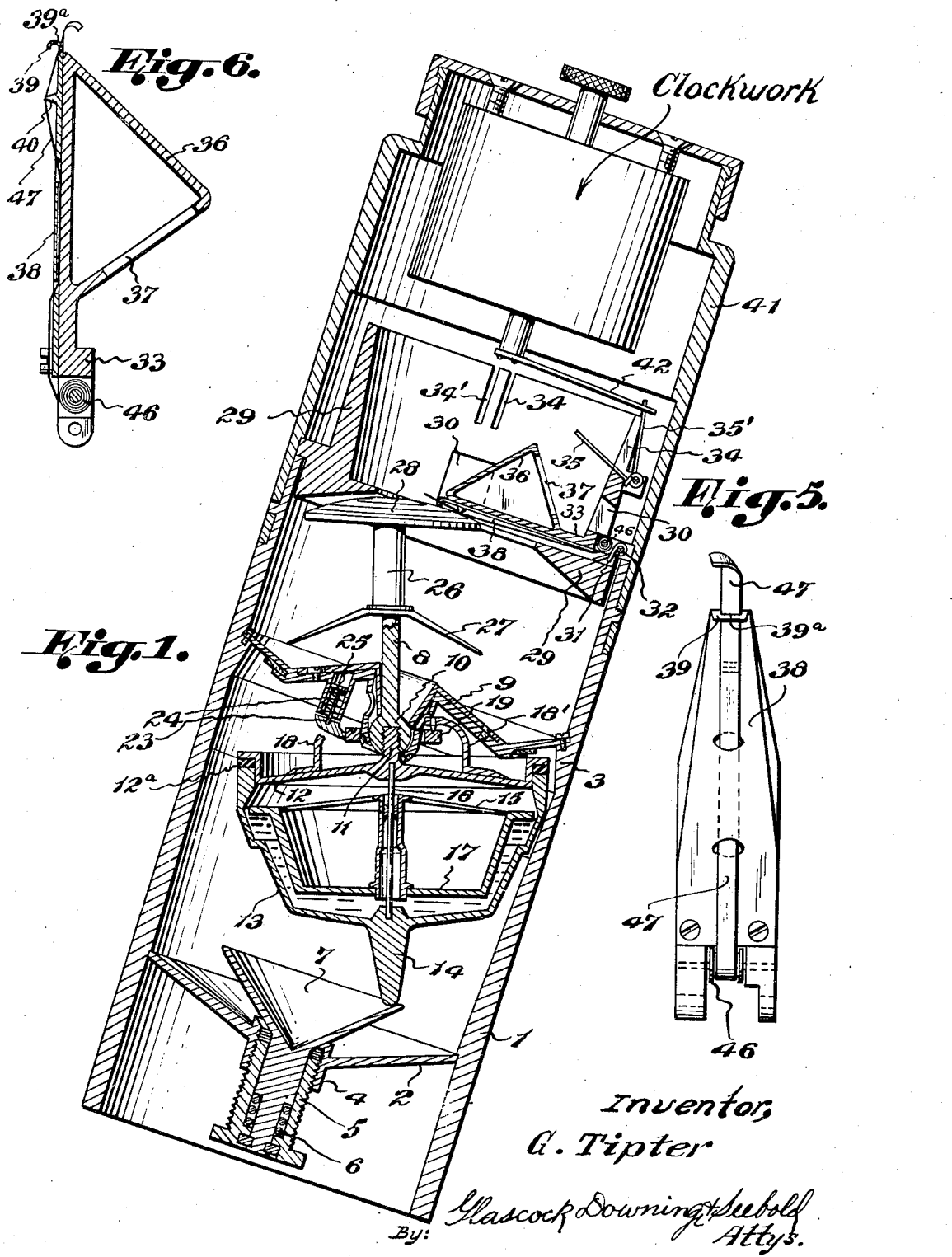
Inventor,
G. Tipter
By: Glascock Downing & Seebold
Attys.

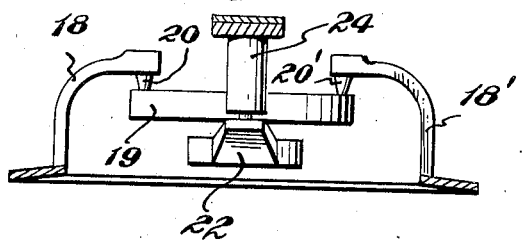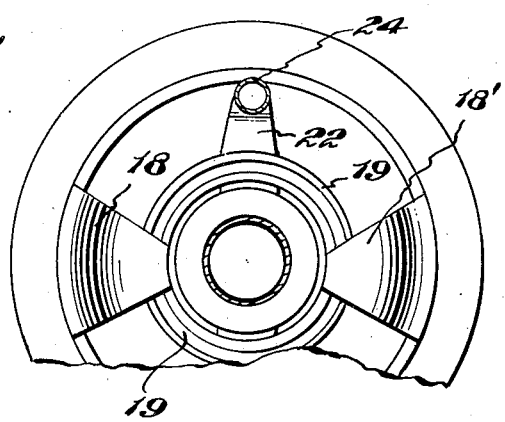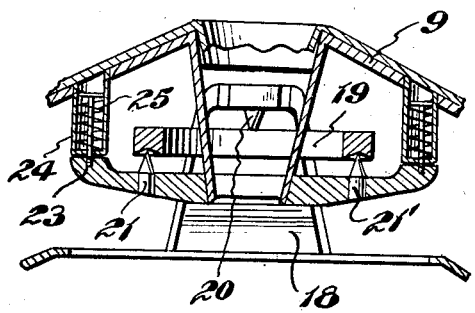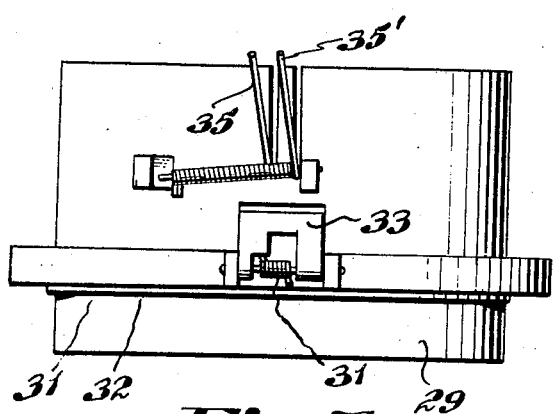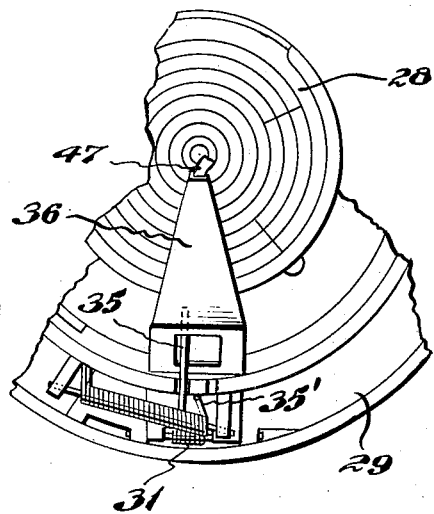

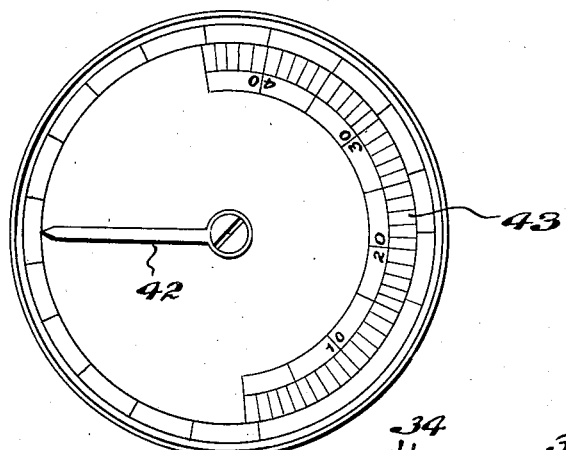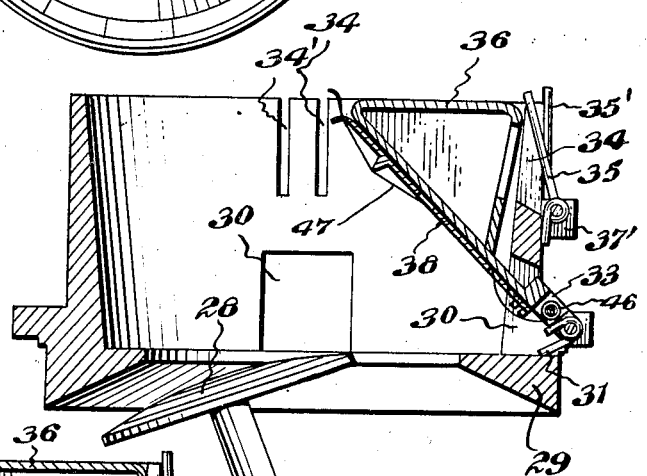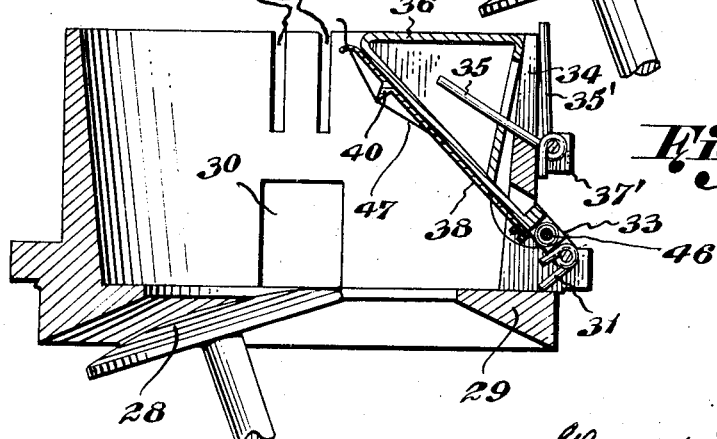

Patented June 18, 1940

2,205,022

UNITED STATES PATENT OFFICE 2,205,022

BORE HOLE DIRECTION TESTER

Georg Tipter, Campina, Rumania

Application December 27, 1937, Serial No. 181,964.
Renewed April 23, 1940. In Rumania January 23, 1937

6 Claims. (Cl. 33—205.5)

It is known that one of the main requirements, in sounding for oil wells or the like, is to obtain bore holes that are as vertical as possible, and from this there arises a need for suitable appliances for ascertaining from time to time whether the bore is vertical. Various means are known for this purpose, including for example a construction in which the verifying of the vertical bore is effected by the aid of a photographic camera, but all the means hitherto known for determining the deviation from the vertical exhibit more or less serious disadvantages, which have hindered their introduction in practice.

The present invention relates to means for automatically and successively recording the oriented deviation from the vertical in bore holes, which renders it possible to ascertain the position of the bore hole in question in relation to the vertical, that is to say, the degree and the direction of any deviation, at different depths, in an accurately adjustable and completely automatic manner. All recording is carried out in duplicate, for the sake of greater reliability, so that the recorded results obtained are absolutely satisfactory.

One embodiment of apparatus according to the invention is illustrated in the accompanying drawings, in which Figure 1 shows a longitudinal section through the indicating apparatus when ready for operation, Figure 2 is an elevational view of the Cardan joint.

Figure 3 is a fragmentary plan view of a universal joint.

Figure 4 is a sectional view of the Cardan joint taken at right angles with respect to Figure 2.

Figure 5 illustrates one of the recording arms as viewed from the bottom.

Figure 6 is a longitudinal sectional view of one of the recording arms.

Figure 7 is an elevational view of the recording mechanism illustrating the manner in which one of the spiral springs is mounted on the muff.

Figure 8 is a fragmentary top plan view illustrating one of the recording arms and a portion of the record chart.

Figure 9 illustrates a scale provided inside the casing and the pointer for moving the spiral springs into the slots of the muff.

Figure 10 is a sectional view of a recording arm prior to actuation thereof showing the manner in which one of the springs strikes the stirrup.

Figure 11 is a sectional view illustrating the position of the arm after the recording operation has been completed.

The apparatus according to the invention consists of a cylinder 1, which is closed at the bottom by a floor 2, and has in the upper portion a circular shoulder 3, upon which the actual indicating appliance bears. The floor 2 of the cylinder 1 is equipped with a central sleeve 4, having an internal screw thread, into which a tubular element 5 is screwed. In this tubular element 5 is inserted, with the interposition of a spiral spring 6, a funnel or hopper 7, which serves for fixing the position of the actual indicating appliance while it is in its position of rest.

The mechanism that actually indicates the vertical position consists of a thick vertical needle 8, which is connected by a Cardan joint with a carrier plate 9, which latter bears upon the cylindrical shoulder 3 in the interior of the cylinder. The vertical needle 8 is constructed at its lower end as a ball 10, which is screwed onto a central upper extension 11 of a swing body, and is thereby rigidly connected with the latter. This swing body consists of a cover 12, which is screwed on to an under casing 13, with the interposition of a fluid-tight packing of india rubber or the like 12a. The undercasing 13 terminates in a conical point 14, which fits into the funnel or hopper 7 when screwed into an upper position for the purpose of securing it in place when in a state of rest. In the interior of the swing body 12, 13 there is a suitable liquid, for instance petroleum, glycerine or the like, in which a float 15 is movable about a vertical pivot 16. This float consists of thin sheet metal, and upon its under portion is secured a magnetic needle 17. The aforementioned swing body 12, 13 is connected with the cover 9 by a Cardan joint, for which purpose there are provided upon the cover 12 two arms 18 and 18', below which is a ring 19, which is guided on the one hand by the pointed tips 20 and 20' of the arms 18 and 18' and on the other hand by the pointed tips 21 and 21' of a stirrup 22 connected with the cover 9 as shown more clearly in Figs. 2, 3 and 4.

The resilient suspension of the Cardan joint, with the swing body 12, 13 suspended therefrom, is effected by providing the stirrup 22 at each end with a bore into which is screwed in each case the lower end of a screw 23, the upper end of which is located in a sleeve 24, which is secured to the under surface of the cover 9. Around the two screws 23 are placed suitable helical springs 25, which resiliently protect the Cardan joint as a whole against shocks, vibrations or the like, which are eliminated by the ball of the needle 8.

Upon the pointed tip of the vertical needle 8 is mounted the actual indicating member of the recording mechanism, which consists of a sleeve 26, at the lower end of which is arranged a magnetic needle 27, while at its upper end is provided a support 28 in the shape of a sector of a sphere for the recording sheet.

The actual recording member of the apparatus according to the invention is lodged in a muff 29, which is mounted upon the upper portion of the cylinder 1. In the under portion of the muff 29 is provided a row of notches or apertures 30, through which recording arms 33 secured by means of pivots 32 provided with return springs 31 project inwards. Above each of the apertures 30 are arranged two vertical longitudinal incisions 34, 34', through which the straight portions of two spiral springs 35, 35' secured externally to the muff 29 extend inwards or are so placed that they project a definite distance beyond the upper margin of the muff 29. These pressure springs 35, 35' act in such a way, after their release, upon the recording arms 33, that the latter are pressed downwards for the purpose of recording, and are returned immediately afterwards by the return springs 31.

The recording arms 33 are equipped with an almost right-angled stiffening stirrup 36, which is provided on its vertical surface with a window 37, through which the releasing springs 35, 35' can extend after actuating the recording arms. Upon the under side of the arms 33 is screwed in each case a blade spring 38, which is provided at its upper end with a stop 39, which serves to limit the deflection of the spring blade 38. The outwardly projecting portion of the arm 33 is provided with a notch or aperture 39a, in which an ink ribbon 47 from a spool 46 is inserted and secured in a suitable manner, whereupon the ink ribbon is guided forward between the arm 33 itself and the spring blade 38, this being arranged in such a way that it comes out again through a suitable aperture and is carried over the front portion of the spring blade 38 to the tip of the arm 33, after having passed over a pin 40 arranged upon the front portion of the spring blade 38, this pin marking a point when struck upon the recording sheet.

Upon the cylinder 1 is mounted, as the last portion of the apparatus according to the invention, a cover 41, which is kept so high that it can also accommodate the muff 29 previously mounted with the recording mechanism itself. In the upper portion of the cover 41 is lodged a clockwork mechanism, which moves a pointer 42, upon a scale 43, which is divided into any convenient number of minutes. The pointer 42 can be conveniently rotated by the clockwork and moves, in the course of the revolution of the clockwork, over the upper margin of the muff 29, for releasing the springs 35, 35' of the individual recording arms 33 to spring inwards in the course of its rotation.

The apparatus according to the invention operates in the following manner: The apparatus as a whole is first brought into the operative position by screwing back the funnel 7, then the clockwork in the cover 41 is wound up and brought into complete agreement with a second clock, which is located at the surface of the bore hole. The springs 35, 35' are then moved laterally of the longitudinal slots 34, 34', whereupon the entire apparatus is enclosed in a tube of non-magnetic metals, such as bronze, aluminium or the like, and is lowered into the bore hole to be examined.

After the apparatus, prepared for recording, has been lowered to the desired depth at which the recording is to be effected, and after the time adjusted for the release of the first record to be made has expired, the pointer 42 moves the end of the first spring 35, projecting beyond the margin of the muff 29, into the slot 34, whereupon this spring 35 engages the corner of the stirrup 36 and depresses the arm 33, to press the ink ribbon covering the pin or stylus 40, upon the diagram sheet located thereunder, which is supported horizontally by the vertical needle 8. In order to obtain a completely reliable recording of the degree of deviation, the recording is repeated after the lapse of 90 seconds, within which time the advancing pointer 42 has come to the second spring 35' of the same arm 33, and within which time the diagram sheet, together with its carrier 26, has again reached its position of complete rest. Now if the two dots of this double recording completely register with one another, this is an indication of an accurate record of the position tested in relation to the vertical.

The operation of the apparatus briefly described above will be more readily understood by referring to Fig. 11 which illustrates the position of the spring 35 after the pointer 42 has moved the straight portion thereof into the slot 34. The end portion of the spring then strikes the corner of the stirrup 36 to move the arm 33 downwardly. The spring 35 moves the arm 33 downwardly and the spring is arrested by the bottom portion of the slot 34 as illustrated in Fig. 1. The recording arm however continues to move downwardly in consequence of its inertia and the spring blade 38 moves the pin 40 and the ribbon 47 into engagement with the recording sheet.

The springs 35 and 35' are considerably stronger than the spring 31 so that the force of the spring 31 is overcome when the springs 35 and 35' are released. After the arm 33 has effected the recording the arm is moved upwardly by the spring 31 to a position illustrated in Fig. 11. The spring 35 passes through the opening 37 when the recording arm is raised to the position shown in Fig. 11. The same arm 33 is then in a position to be again actuated by the spring 35'.

The apparatus according to the invention enables further recordings to be effected in the same series, for the advancing pointer 42, after a definite time, within which the apparatus may be lowered or raised any convenient distance, will actuate the releasing springs 35, 35' of the next arm 33, and the series of operations previously described will be repeated. In order to ensure the individual records being separated, the ink ribbons of the successive recording arms 33 are of different colours, so that the records can be easily distinguished by their colours.

The records obtained in this way therefore indicate the degree of deviation from the vertical at one or more positions in a bore hole in the form of dots of different colours, which are marked in the circles of a record sheet, and from which the exact degree of deviation can be seen or calculated without difficulty.

The records however also give some information concerning the proportions of the deviation to the four cardinal points of the compass, since the record sheet, in consequence of the action of the magnet 17, of ten-fold strength, of the swing body 12, 13, upon the magnet 27 of the indicating appliance 26, 28 itself, will always adjust itself into a north and south direction, so that by marking the cardinal points upon the diagram sheets, the oriented deviation can easily be read off.

What I claim is:

1. Apparatus for automatically recording the degree and direction of any deviation from the vertical at different depths in bore holes for oil wells and the like comprising, a substantially cylindrical casing adapted to be lowered into the bore hole in a normally vertical position and to assume any inclination of the bore hole at the particular depth to which it is lowered, a weighted needle so supported inside the casing that it assumes a vertical position notwithstanding deviation of the casing from the vertical, a record sheet so mounted upon the needle as to be rotatable relatively thereto about a substantially vertical axis, magnetic means connected with the record sheet to bring a standard north and south line on the record sheet into position notwithstanding movements of the casing or of the weighted needle, a marking instrument consisting of a plurality of arms pivoted to be moved in radial planes with respect to the casing and each arm adapted to make a mark on the record sheet, and means for actuating said arms at predetermined time intervals whereby the position of each mark in relation to a pre-determined zero point denoting the angle and direction of any deviation of the casing, and therefore of the bore hole, from the vertical.

2. Apparatus for automatically recording the degree and direction of any deviation from the vertical at different depths in bore holes for oil wells and the like as claimed in claim 1, wherein the means for weighting the needle is provided with an axial spike extending downwards in the casing, and an axially adjustable funnel-shaped body resiliently mounted at the lower end of the casing and adapted to be brought into engagement with the said spike to restrain movement of the weighted needle when the apparatus is not in operation.

3. Apparatus for automatically recording the degree and direction of any deviation from the vertical at different depths in bore holes for oil wells and the like comprising, a casing, a marking instrument including a muff mounted upon the upper portion of the casing and formed with a series of apertures and with two slots above each aperture, recording arms pivotally mounted outside the muff and extending inwards through said aperture, spiral springs secured externally to the muff and each spring being adapted to engage the muff adjacent a slot, a marking stylus on each recording arm, each spiral spring when moved into one of said slots impelling one of the recording arms towards the record sheet until the stylus makes a mark thereon, and clockwork mechanism for moving the spiral springs successively into the respective slot after predetermined intervals of time.

4. Apparatus for automatically recording the degree and direction of any deviation from the vertical at different depths in bore holes for oil wells and the like as claimed in claim 6, further comprising return springs for retracting the marking arms from the record sheet immediately after they have made a mark thereon.

5. Apparatus for automatically recording the degree and direction of any deviation from the vertical at different depths in bore holes for oil wells and the like, as claimed in claim 6, wherein each of the recording arms is provided with an ink ribbon, and a marking stylus adapted to mark the record sheet through the ink ribbon when one of the spiral springs actuates the recording arm, the ink ribbons on different recording arms being of different colors.

6. Apparatus for recording the deviation from the vertical in wells comprising, a casing adapted to be lowered in the well and assume any inclination thereof, a weighted needle mounted in the casing to assume a vertical position, a record sheet carried by said needle, a plurality of recording arms pivotally mounted with respect to the casing adjacent said record sheet, at least two permanent magnets associated with said weighted needle to rotate the record sheet in relation to the magnetic field of the earth and hold the same in the rotated position, and means for moving each of the arms into recording engagement with the record sheet.

GEORG TIPTER.